United States Patent
Münter

(10) Patent No.: US 9,102,781 B2
(45) Date of Patent: Aug. 11, 2015

(54) AQUEOUS POLYURETHANE/POLYUREA DISPERSIONS

(75) Inventor: Jürgen Münter, Fellbach (DE)

(73) Assignee: STAHL INTERNATIONAL BV, Waalwijk (NL)

( * ) Notice: Subject to any disclaimer, the term of this patent is extended or adjusted under 35 U.S.C. 154(b) by 0 days.

(21) Appl. No.: 12/442,008

(22) PCT Filed: Sep. 4, 2007

(86) PCT No.: PCT/EP2007/059230
§ 371 (c)(1),
(2), (4) Date: Mar. 19, 2009

(87) PCT Pub. No.: WO2008/034717
PCT Pub. Date: Mar. 27, 2008

(65) Prior Publication Data
US 2009/0318634 A1   Dec. 24, 2009

(30) Foreign Application Priority Data

Sep. 21, 2006   (EP) .................................... 06121040

(51) Int. Cl.

| | | |
|---|---|---|
| C08G 18/00 | (2006.01) | |
| C08G 18/32 | (2006.01) | |
| C08G 18/08 | (2006.01) | |
| C08G 18/12 | (2006.01) | |
| C08G 18/28 | (2006.01) | |
| C08G 18/38 | (2006.01) | |
| C08G 18/40 | (2006.01) | |
| C08G 18/42 | (2006.01) | |
| C08G 18/44 | (2006.01) | |
| C08G 18/66 | (2006.01) | |
| C08G 18/72 | (2006.01) | |
| C09D 175/04 | (2006.01) | |

(52) U.S. Cl.
CPC ........ *C08G 18/3231* (2013.01); *C08G 18/0823* (2013.01); *C08G 18/0857* (2013.01); *C08G 18/0866* (2013.01); *C08G 18/12* (2013.01); *C08G 18/283* (2013.01); *C08G 18/3834* (2013.01); *C08G 18/4018* (2013.01); *C08G 18/4277* (2013.01); *C08G 18/44* (2013.01); *C08G 18/6659* (2013.01); *C08G 18/722* (2013.01); *C09D 175/04* (2013.01)

(58) Field of Classification Search
CPC ........... C08G 18/0823; C08G 18/0866; C08G 18/10; C08G 18/0857; C08G 18/3231
USPC ............ 524/590, 591, 837, 838, 839; 528/28, 528/59, 61, 76, 78, 85
See application file for complete search history.

(56) References Cited

U.S. PATENT DOCUMENTS

| | | | | |
|---|---|---|---|---|
| 4,857,565 | A * | 8/1989 | Henning et al. | 523/343 |
| 4,983,662 | A * | 1/1991 | Overbeek et al. | 524/501 |
| 5,137,967 | A | 8/1992 | Brown | |
| 5,541,251 | A * | 7/1996 | Bontinck et al. | 524/507 |
| 5,656,701 | A * | 8/1997 | Miyamoto et al. | 525/453 |
| 5,990,245 | A | 11/1999 | Esselborn et al. | |
| 2004/0231561 | A1 | 11/2004 | Kaul et al. | |
| 2005/0159575 | A1 | 7/2005 | Rische et al. | |
| 2011/0091712 | A1 | 4/2011 | Muenter | |

FOREIGN PATENT DOCUMENTS

| | | |
|---|---|---|
| DE | 102004002526 | 8/2005 |
| EP | 0622378 | 11/1994 |
| EP | 1059346 | 12/2000 |
| EP | 1172426 | 1/2002 |

OTHER PUBLICATIONS

PCT International Search Report for PCT/EP2007/059230 mailed Jun. 11, 2007.
PCT Written Opinion of the International Searching authority for PCT/EP2007/059230, Jun. 11, 2007.
Dieterich, "Aqueous Emulsions, Dispersions and Solutions of Polyurethanes; Synthesis and Properties," Progress in Organic Coatings 9, pp. 281-340, (1981).
Adam et al. "Polyurethanes," Wiley-VCH GmbH and Co. KGaA, Weinheim, pp. 1-12 (205).

* cited by examiner

*Primary Examiner* — Michael L Leonard
(74) *Attorney, Agent, or Firm* — Peacock Myers, P.C.; Jeffrey D. Myers

(57) ABSTRACT

The present invention pertains to aqueous polyurethane-polyurea dispersions which are prepared by the acetone process using methyl acetate instead of ketones and are chain-extended using hydrazine or derivatives thereof, these dispersions having an improved stability towards thermal yellowing and a relatively low residual hydrazine/hydrazine derivative content.

9 Claims, No Drawings

AQUEOUS POLYURETHANE/POLYUREA DISPERSIONS

This application is a U.S. National Phase application under 35 U.S.C. §371 of PCT Application No. PCT/EP2007/059230, filed Sep. 4, 2007, which claims priority under 35 U.S.C. §119 (a)-(d) of European Patent Application No. 06121040.7, filed Sep. 21, 2006.

The present invention pertains to aqueous polyurethane-polyurea dispersions which are prepared by the acetone process using methyl acetate instead of ketones and are chain-extended using hydrazine and/or derivatives thereof, these dispersions having an improved stability towards thermal yellowing and a relatively low residual hydrazine/hydrazine derivative content.

The preparation of aqueous polyurethane-polyurea dispersions by means of the acetone process is well established, being known for example from Prog. Org. Coat. 9 (1981) 281-340. In the process a prepolymer containing isocyanate groups is prepared in solution or, after the reaction has been accomplished, is dissolved in acetone or other solvents readily removable by distillation. Subsequently the prepolymer solution is dispersed in water and a chain extension reaction is carried out, using polyamines. The extension reaction may take place in part or else completely prior to dispersing. Finally the solvent is distilled off.

With regard to the problem of thermal yellowing it is known from U.S. Pat. No. 5,137,967 and DE 10 2004 002 526 that the use of hydrazine or hydrazine hydrate for the chain extension, rather than primary or secondary amines, leads to polyurethanes having an improved thermal yellowing stability. However, we have found, especially when using relatively unreactive isocyanates and acetone as solvent, that the hydrazine concentrations in the resulting polyurethane-polyurea dispersions are unacceptable, owing to the high toxicity of hydrazine.

Many other non-ketonic solvents are reactive towards isocyanates (e.g. alcohols, carboxylic acids), objectionable from a toxicological or ecological standpoint (e.g. benzene, halogenated solvents), or more difficult to distil off than acetone, owing to their higher boiling point.

For technical reasons it is not always possible, when preparing polyurethane-polyurea dispersions, to avoid a process using solvents. As a consequence of this there continues to be a need to be able to prepare, using a solvent process, aqueous polyurethane-polyurea dispersions which are stable towards thermal yellowing and have low concentrations of non-polymerically attached hydrazine or derivatives thereof.

It has now been found that polyurethanes with improved thermal yellowing stability and a lower residual hydrazine/hydrazine derivative content are obtained if, when preparing polyurethane-polyurea dispersions, in contradiction to the conventional acetone process, the solvent used is methyl acetate, and the chain extension is carried out using hydrazine or derivatives thereof, a mixture with primary or secondary amines being possible but not preferred.

The invention accordingly provides a process for preparing aqueous polyurethane-polyurea dispersions which are stable to thermal yellowing, by reaction of polyisocyanates, polymeric polyols or polymeric polyamines, or both, and isocyanate-reactive hydrophilicizing compounds to form an NCO-containing prepolymer, followed by a chain extension reaction with hydrazine or derivatives thereof, or both, characterized in that the reaction for preparing the prepolymer or the further chain extension reaction or else both reaction steps is or are carried out in the presence of methyl acetate.

The process is particularly suitable if
A) first of all an NCO-containing polyurethane prepolymer is prepared by reacting
A1) polyisocyanates with
A2) polymeric polyols and/or polyamines having number-average molecular weights of 400 to 8000 g/mol,
A3) if desired, low molecular weight polyalcohols, polyamines or amino alcohols, having number-average molecular weights of 17 to 400 g/mol, and
A4) isocyanate-reactive, ionically, potentially ionically and/or nonionically hydrophilicizing compounds,
A5) if desired, in plasticizers or solvents which boil above 100° C., which are non-ketonic and which are inert or only very slightly reactive towards isocyanate and hydrazine,
A6) if desired, in methyl acetate,
B) either the prepolymer obtained from step A is dissolved in a solvent A5) and/or A6) or, if the preparation has already been carried out in the presence of A5) and/or A6), the prepolymer solution is, where appropriate, diluted by further addition of solvents A5) and/or A6), and
C) the remaining free NCO groups of the prepolymer are reacted with hydrazine or derivatives thereof so as to attain an arithmetic degree of chain extension of 40% to 150%, preferably 60% to 120%, more preferably 80% to 105%, and very preferably 85% to 100%.

The invention further provides aqueous polyurethane-polyurea dispersions which are stable towards thermal yellowing and have a low residual hydrazine/hydrazine derivative content by this process.

Suitable polyisocyanates A1) of the formula $X(NCO)_p$, in which p is a number from 1 to 4, preferably from 2 to 3, and X is an aliphatic, cycloaliphatic, aromatic or araliphatic hydrocarbon radical. X is preferably an aliphatic hydrocarbon radical having 3 to 20 carbon atoms, a cycloaliphatic or aromatic hydrocarbon radical having 5 to 15 carbon atoms or an araliphatic hydrocarbon radical having 6 to 15 carbon atoms.

Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis-(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of 4,4'-diisocyanatodicyclohexylmethane such as the trans/trans, the cis/-cis and the cis/trans isomer, and mixtures of these compounds.

The advantage of increased resistance towards thermal yellowing and of the low residual hydrazine/hydrazine derivative content is particularly great in the case of isocyanates of low reactivity, such as araliphatic and aliphatic isocyanates. Preference is given to 1,6-diisocyanatohexane (HDI), isophorone diisocyanate (IPDI), the isomers of 4,4'-diisocyanatodicyclohexylmethane, and mixtures of these compounds; particular preference is given to isophorone diisocyanate (IPDI), the isomers of 4,4'-diisocyanatodicyclohexylmethane, and mixtures of these compounds.

Polymeric polyols or polyamines A2) come typically from the group of polycarbonates, polyesters, polyethers, polyacrylates, polyolefins and polysiloxanes, as are known from, for example, Ullmann's Encyclopedia of Industrial Chemistry 2005, DOI: 10.1002/14356007.a21_665.pub2 "Polyurethanes", Chapter 3, W. Friederichs.

Suitable polycarbonate polyols are those as may be obtained by, for example, reacting phosgene with an excess of polyhydric alcohols. Examples of suitable dihydric alcohols include ethylene glycol, propane-1,2-diol, propane-1,3-diol, butane-1,3-diol, butene-1,4-diol, butyne-1,4-diol, pentane-1,5-diol, neopentyl glycol, 2-butyl-2-ethyl-1,3-propanediol, bis(hydroxymethyl)cyclohexanes such as 1,4-bis(hydroxylmethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols.

Preferred alcohols are of the general formula HO—$(CH_2)_x$—OH, where x is a number from 1 to 20, preferably an even number from 2 to 20. Examples of such alcohols are ethylene glycol, butane-1,4-diol, hexane-1,6-diol, octane-1,8-diol and dodecane-1,12-diol. Additionally preferred are neopentyl glycol and 2-butyl-2-ethyl-1,3-propanediol. Proportionally it is also possible to use higher polyhydric alcohols such as glycerol, trimethylolpropane, 1,2,6-hexanetriol, 1,2,4-butanetriol, pentaerythritol, quinitol, mannitol and sorbitol.

Also suitable, furthermore, are polyester polyols, which are obtained by reacting polyhydric alcohols with polybasic carboxylic acids. In place of the free polycarboxylic acids it is possible to use the corresponding polycarboxylic anhydrides or corresponding polycarboxylic esters of lower alcohols, or mixtures thereof, to prepare the polyester polyols. The polycarboxylic acids may be aliphatic, cycloaliphatic, araliphatic, aromatic or heterocyclic and may where appropriate be substituted, by halogen atoms for example, and/or unsaturated. Examples that may be mentioned thereof include the following: suberic acid, azelaic acid, phthalic acid, isophthalic acid, phthalic anhydride, tetrahydrophthalic anhydride, hexahydrophthalic anhydride, tetrachlorphthalic anhydride, endomethylenetetrahydrophthalic anhydride, glutaric anhydride, maleic acid, maleic anhydride, fumaric acid, dimeric fatty acids. Preferred dicarboxylic acids of the general formula HOOC—$(CH_2)_y$—COOH, where y is a number from 1 to 20, preferably an even number from 2 to 20, such as succinic acid, adipic acid, sebacinic acid and dodecanedicarboxylic acid, for example. Suitable polyhydric alcohols, preferably diols, include the low molecular weight alcohols specified as synthesis components for the polycarbonate polyols.

Also suitable are lactone-based polyester diols, which are homopolymers or copolymers of lactones, preferably hydroxyl-terminal adducts of lactones with suitable polyfunctional starter molecules. Suitable lactones are preferably those deriving from compounds of the general formula HO—$(CH_2)_z$—COOH, where z is a number from 1 to 20 and where one hydrogen atom of a methylene unit can also be substituted by a $C_1$ to $C_4$ alkyl radical. Examples of $\epsilon$-caprolactone, $\beta$-propiolactone, $\gamma$-butyrolactone and/or methyl-$\epsilon$-caprolactone, and mixtures thereof. Examples of suitable starter components include the low molecular weight polyhydric alcohols specified above as synthesis components for the polycarbonate polyols. The corresponding polymers of $\epsilon$-caprolactone are particularly preferred. Lower polyester diols or polyether diols as well can be used as starters for preparing the lactone polymers. In place of the polymers of lactones it is also possible to use the corresponding, chemically equivalent polycondensates of the hydroxyl carboxylic acids corresponding to the lactones.

Likewise suitable as monomers are polyether diols. They are obtainable in particular by addition polymerization of ethylene oxide, propylene oxide, butylene oxide, tetrahydrofuran, styrene oxide, epichlorohydrine, or part-fluorinated or perfluorinated derivatives of these compounds, with itself or with themselves, in the presence for example of $BF_3$, or by addition reaction of these compounds, where appropriate in a mixture or in succession, with starter components containing reactive hydrogen atoms, such as alcohols or amines, examples being water, ethylene glycol, propane-1,2-diol, propane-1,3-diol, 1,2-bis(4-hydroxyphenyl)propane or aniline.

Likewise suitable as monomers are polyhydroxy olefins, preferably those having 2 terminal hydroxyl groups, such as α,ω-dihydroxypolybutadiene, α,ω-dihydroxypolymethacrylic esters or α,ω-dihydroxypolyacrylic esters. Such compounds are known for example from EP-A-0 622 378. Further suitable polyols are polyacetals, polysiloxanes and alkyd resins.

Suitable low molecular weight compounds A3) are the low molecular weight polyhydric alcohols, preferably diols and triols, specified above as synthesis components for the polycarbonate polyols.

Hydrophilicizing compounds according to A4) are all compounds which have at least one isocyanate-reactive group, preferably hydroxyl groups or amino groups, and also at least one functionality which is ionically, potentially ionically and/or nonionically hydrophilicizing. Examples of ionic and potentially ionic groups are —COOY, —$SO_3$Y, —PO(OY)$_2$ (Y for example=hydrogen, $NH_4^+$, metal cation), —$NR_2$, —$NR_3^+$ (R=hydrogen, alkyl, aryl). Examples of non-ionic hydrophilicizing groups are polyoxyalkylene ethers. Suitable hydrophilicizing compounds are known to the person skilled in the art and are specified and/or explained in DE 10 2004 002 526 in paragraphs [0032] and [0035] to [0039].

The job of reaction with the remaining free NCO groups in accordance with C) is that of hydrazine and its derivatives. These may be hydrazides (e.g. dicarboxylic dihydrazides) or monosubstituted or 1,2-disubstituted hydrazines of the formula (I) to (IV)

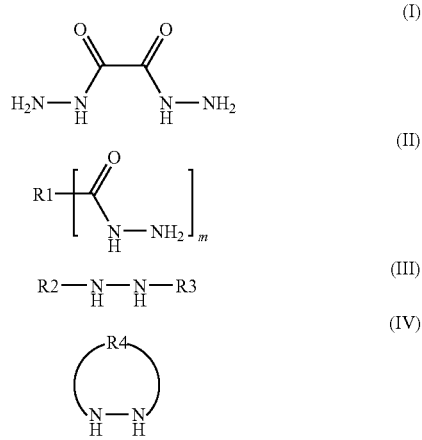

in which

R1 is an alkyl radical having 1 to 20 carbon atoms, an aryl radical having 5 to 20 carbon atoms or an arylalkyl radical having 6 to 20 carbon atoms, m is=1, preferably 1 to 3, R2, R3 is hydrogen or has the same definition as R1, R4 is an alkyl radical having 2 to 6 carbon atoms or an arylalkyl radical having 6 to 20 carbon atoms.

It is preferred to use hydrazine, hydrazine hydrates, aqueous hydrazine solution or dicarboxylic dihydrazides such as oxalic dihydrazide or adipic dihydrazide, for example. Of particular preference are hydrazine hydrates and aqueous hydrazine solutions.

The amount used of components A1) in the process of the invention is preferably 7% to 45% and more preferably 10% to 35% by weight.

The amount used of components A2) in the process of the invention is preferably 50% to 91% and more preferably 60% to 90% by weight.

The amount used of components A3) in the process of the invention is preferably 0% to 30%, more preferably 0% to 15% and very preferably 0% to 8% by weight.

The amount used of components A4) in the process of the invention is preferably 0% to 25%, more preferably 0% to 20% and very preferably 0% to 15% by weight.

The amount used of components A5) in the process of the invention is preferably 0% to 50%, more preferably 0% to 30% and very preferably 0% to 25% by weight.

The sum of the products A1) to A5) is 100% of the NCO-containing prepolymer.

The process of the invention for preparing aqueous PU dispersions can be carried out in one or more stages in homogeneous phase or, in the case of multi-stage reaction, partly in disperse phase. Following complete or partial polyaddition of A1)/-A6) there is a dispersing, emulsifying or dissolving step. This may be followed by a further polyaddition or modification in disperse phase.

Typically, in step A) of the process, the constituents A2) to A4) and the polyisocyanate component A1) for the preparation of a polyurethane prepolymer, are included in whole or in part in an initial charge, which if desired is diluted with a solvent A5) and/or A6) and is heated to relatively high temperatures, preferably in the range from 50 to 120° C.

In the process of the invention it is additionally possible to include in the initial charge, or to meter in later on, the catalysts that are known for accelerating the isocyanate addition reaction, such as triethylamine, 1,4-diazabicyclo[2,2,2]octane, dibutyltin oxide, tin dioctoate or dibutyltin dilaurate, tin bis(2-ethylhexanoate) or other organometallic compounds.

Subsequently any of constituents A1)-A6) not added at the beginning of the reaction are metered in.

In the case of the preparation of the polyurethane prepolymer in step A) the molar amount-of-substance ratio of isocyanate groups to isocyanate-reactive groups is 1.0 to 3.5, preferably 1.1 to 3.0, more preferably 1.1 to 2.5 and very preferably 1.1-2.0.

The reaction of components A1)-A4) to form the prepolymer is partial or complete, but preferably complete. The degree of conversion is typically monitored by following the NCO content of the reaction mixture. This can be done using either spectroscopic measurements, examples being infrared or near-infrared spectra, determinations of the refractive index, or else using chemical analyses, such as titrations, on samples taken. In this way, polyurethane prepolymers containing free isocyanate groups are obtained, in bulk (without solvent) or in solution.

During or after the preparation of the polyurethane prepolymers from A1) to A4), and if it has not already been carried out in the starting molecules, the anionically and/or cationically dispersing groups are converted partly or fully to the salt form. In the case of anionic groups this is done using bases such as ammonia, ammonium carbonate or ammonium hydrogen carbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine. The molar amount of substance of the bases is between 50% and 150%, preferably between 75% and 125%, more preferably 85-115% of the amount of substance of the anionic groups. In the case of cationic groups, dimethyl sulfate, succinic acid or fumaric acid is used. Where only nonionically hydrophilicized compounds A4) with ether groups are used, the neutralization step is not needed. Neutralization may also take place simultaneously with dispersion, with the dispersing water already containing the neutralizing agent.

Subsequently, in a further step of the process, step B), if it has not taken place or has taken place only partly in A), the resulting prepolymer is dissolved using the solvent A5) and/or A6).

In step C) of the process the hydrazine and/or its derivates are reacted with the remaining isocyanate groups. This chain extension/termination may be carried out either in solvent prior to dispersing, during dispersing, or in water after dispersing.

The degree of chain extension, in other words the equivalents ratio of the newly added reactive groups of the compounds used for chain extension in C) to free NCO groups of the prepolymer is typically between 50-200%, preferably between 60-120%, more preferably between 80-105% and very preferably between 85-100%.

Hydrazine and its derivatives can be used in C) optionally in dilution with water and/or the solvent A5) and/or A6) in the process of the invention, individually or in mixtures, with any sequence of addition being possible in principle.

The PU dispersions of the invention are typically prepared either by introducing the dissolved prepolymer or the chain-extended polyurethane polymer into the dispersing water, where appropriate with strong shearing, such as vigorous stirring, for example, or, conversely, the dispersing water is added to the prepolymer or polymer solutions. It is preferred to add the water to the dissolved prepolymer.

The solvent A6) still present in the dispersions after the dispersing step is typically then removed distillatively. The distillation is preferably carried out under reduced pressure. Removal actually during dispersing is likewise possible.

The dispersions obtained in this way have a solids content of 10% to 70%, preferably 20% to 65% and more preferably 25% to 65% by weight.

Depending on degree of neutralization and ionic group content, the dispersion can be made very finely particulate, so that it has virtually the appearance of a solution; or alternatively, very coarsely particulate formulations are possible, and likewise have adequate stability.

The invention further provides mixtures of the polyurethane-polyurea dispersions of the invention with other aqueous binders and crosslinkers which are used for producing coating materials. In this context it is also possible to use the auxiliaries and additives known per se from coating technology, such as thickeners, fillers, pigments, waxes, texture agents, dyes, solvents, flow control assistance, and crosslinkers, for example. The use of additives for reducing the thermal yellowing is an additional possibility.

The invention further provides coatings of the polyurethane-polyurea dispersions of the invention and/or their abovementioned mixtures on any desired substrates, such as metal, wood, glass, glass fibres, carbon fibres, stone, ceramic minerals, concrete, hard and flexible plastics of any of a very wide variety of kinds, woven and non-woven textiles, leather, paper, hard fibres, straw and bitumen, for example, which prior to coating may also be provided with typical primer coats if desired.

The invention additionally provides the above-described coated substrates and articles manufactured from them.

EXAMPLES

Determination of Thermal Yellowing 25 g of the polyurethane-polyurea dispersion are introduced into a glass dish (10×20 cm²) and dried at 60° C. overnight. A portion of the resulting film is placed on a glass plate and stored at 120° C. for 168 h. The discoloration is assessed by visual comparison of the samples.
Detection of Hydrazine in Polyurethane-Polyurea Dispersions The dispersion is diluted 1000 times. To 5 ml of this dilute solution there are added 5 ml of Aquamerck® hydrazine (colorimeter determination with 4-dimethylaminobenzaldehyde). A yellow coloration indicates hydrazine.

The determination of the effective particle diameter is carried out using the Particle Size Analyzer 90 Plus from Brookfield Instruments Corporation.

The determination of the viscosity of the dispersion is carried out using a DIN CUP 4 at 20° C.; the efflux time is measured in seconds.

Example 1

Comparative 254.0 g (124.5 mmol) of polycarbonatediol based on 3-methyl-1,5-pentanediol/1,6-hexanediol (Placcel CD220PL, OHZ=55), 12.1 g (90 mmol) of dimethylolpropionoic acid, 1.34 g (10 mmol) of trimethylolpropane, 17.0 g (10 mmol) of Polyglykol B11/50 (monofunctional polyether based on ethylene oxide/propylene oxide) and 90 g of N-methylpyrrolidone are mixed at 65° C. Subsequently a mixture of 50.4 g (228 mmol) of isophorone diisocyanate and 26.2 g (100 mmol) of 4,4'-diisocyanatodicyclohexylmethane is added and the mixtures are stirred at 90° C. until the theoretical NCO value is reached. After allowing the prepolymer to cool somewhat, 150 g of acetone are added, cooling is continued to 40-50° C., and 9.1 g (90 mmol) of triethylamine are added. Subsequently 713 g of cold water (5-10° C.) are stirred in over the course of 10 minutes. This low-viscosity dispersion is admixed over the course of 10 minutes with a solution of 5.35 g (89 mmol) of 1,2-ethylenediamine in 40 g of water, after which stirring takes place for 15 minutes. The acetone is then removed by vacuum distillation (2 h at up to 40° C. and approx. 200 mbar). This gives a storage-stable dispersion having a solids content of 30% by weight, an effective particle diameter of 54 nm and a viscosity of 14 s.

Example 2

Comparative

The prepolymer is prepared as in Example 1. After allowing the prepolymer to cool somewhat, 150 g of acetone are added, cooling is continued to 40-50° C., and 9.1 g (90 mmol) of triethylamine are added. Subsequently 713 g of cold water (5-10° C.) are stirred in over the course of 10 minutes. This low-viscosity dispersion is admixed over the course of 10 minutes with a solution of 4.45 g (89 mmol) of hydrazine monohydrate in 40 g of water, after which stirring takes place for 15 minutes. The acetone is then removed by vacuum distillation (2 h at up to 40° C. and approx. 200 mbar). This gives a storage-stable dispersion having a solids content of 30% by weight, an effective particle diameter of 52 nm and a viscosity of 14 s.

Example 3

Comparative

The polyurethane-polyurea dispersion is prepared as in Example 2. However, instead of the 150 g of acetone, the same amount of ethyl acetate is used. When water is added a dispersion of relatively high viscosity is obtained with a gel-like consistency, its viscosity dropping only slightly even when the hydrazine hydrate is added. The distillation takes place at up to 40° C. and approximately 200 mbar. In the course of the distillation there is a marked drop in the viscosity of the dispersion. After 2 h there is still a strong odour perceptible, after 4 h only a slight odour of ethyl acetate. A storage-stable dispersion is obtained which has a solids content of 30% by weight, an effective particle diameter of 90 nm and a viscosity of 18 s.

Example 4

Inventive

The polyurethane-polyurea dispersion is prepared as in Example 2. However, the 150 g of acetone are replaced by the same amount of methyl acetate. This gives a storage-stable dispersion having a solids content of 30% by weight, an effective particle diameter of 48 nm and a viscosity of 14 s.

Example 5

Inventive 403 g (204 mmol) of polycaprolactonediol (OHZ=56.8), 105.1 g (103 mmol) of polypropylene glycol (OHZ=110), 34.3 g (256 mmol) of dimethylolpropionic acid and 17.4 g (100 mmol) of adipic dihydrazide are introduced at 60° C. and 300 g of methyl acetate and 0.1 g of dibutyltin dilaurate are added. Subsequently 194.0 g (878 mmol) of isophorone diisocyanates are added and the mixture is stirred under reflux until the theoretical NCO value is reached. This prepolymer is cooled to 40-50° C. and then 25.9 g (256 mmol) of triethylamine are added. Then 1200 g of cold water (5-10° C.) are stirred in over the course of 10 minutes. This dispersion is admixed over the course of 10 minutes with a solution of 10.2 g (204 mmol) of hydrazine monohydrate in 40 g of water, and stirring takes place for 15 minutes. This is followed by the removal of the methyl acetate by vacuum distillation. This gives a storage-stable dispersion having a solids content of 32.5% by weight, an effective particle diameter of 50 nm and a viscosity of 14 s.

Evaluation of Results

In comparison to inventive Example 4, comparative Example 1 shows a much more severe thermal yellowing.

With comparative Example 2, in contrast to inventive Example 4, hydrazine can be detected.

With comparative Example 3, in contrast to comparative Example 2, there is no hydrazine detectable, and the thermal yellowing is similar to that for inventive Example 4. However, distinct processing disadvantages are in evidence as compared with inventive Example 4. For instance, the viscosity of the dispersion prior to distillation imposes significantly more exacting requirements on the apparatus and is possibly no longer manageable on the production scale. Moreover, the removal of the ethyl acetate takes significantly greater time and energy than in the case of acetone or methyl acetate. As compared with inventive Example 4, the viscosity of the dispersion is increased and the effective particle diameter is significantly enlarged, this being clearly perceptible to the naked eye and leading to performance disadvantages on application, such as a lower depth of penetration into absorbent substrates, for example.

In processing terms, Example 4 and comparative Example 2 are virtually identical, with the consequence that methyl acetate does not carry any disadvantages as compared with acetone.

Example 5 shows thermal yellowing at a low level similar to that of Example 4. No significant amounts of hydrazine are detectable.

The invention claimed is:

1. Process for preparing aqueous polyurethane-polyurea dispersions which are stable to thermal yellowing, comprising the steps of reacting polyisocyanates, polymeric polyols or polymeric polyamines, or both, and isocyanate-reactive hydrophilicizing compounds to form an NCO-containing prepolymer, and conducting a chain extension reaction with hydrazine or hydrazine hydrate, or both, wherein
   A) the NCO-containing polyurethane prepolymer is prepared by reacting
      A1) polyisocyanates selected from the group consisting of aliphatic isocyanates and araliphatic isocyanates with
      A2) polymeric polyols, polyamines or both, wherein the polyols, polyamines or both have number-average molecular weights of 400 to 8000 g/mol,
      A3) optionally, low molecular weight polyalcohols, polyamines or amino alcohols, having number-average molecular weights of 17 to 400 g/mol, and
      A4) isocyanate-reactive, ionically, potentially ionically, nonionically hydrophilicizing compounds or a mixture thereof,
      A6) in methyl acetate,
   B) optionally the prepolymer obtained from step A is diluted by further addition of a solvent, A6), and
   C) the remaining free NCO groups of the prepolymer are reacted with hydrazine or hydrazine hydrate as chain extenders so as to attain an arithmetic degree of chain extension of 40% to 100%, and
   wherein water is added by introducing the dissolved prepolymer or the chain extended polyurethane polymer into the dispersing water, or the dispersing water is added to the prepolymer or the polymer solutions.

2. Process according to claim 1, wherein the chain extenders are hydrazine hydrates or an aqueous hydrazine solution.

3. An aqueous polyurethane-polyurea dispersion stable towards thermal yellowing, produced in accordance with a process comprising the steps of reacting polyisocyanates, polymeric polyols or polymeric polyamines, or both, and isocyanate-reactive hydrophilicizing compounds to form an NCO-containing prepolymer, and conducting a chain extension reaction with hydrazine or hydrazine hydrate, or both, wherein
   A) the NCO-containing polyurethane prepolymer is prepared by reacting
      A1) polyisocyanates selected from the group consisting of aliphatic isocyanates and araliphatic isocyanates with
      A2) polymeric polyols, polyamines or both, wherein the polyols, polyamines or both have number-average molecular weights of 400 to 8000 g/mol,
      A3) optionally, low molecular weight polyalcohols, polyamines or amino alcohols, having number-average molecular weights of 17 to 400 g/mol, and
      A4) isocyanate-reactive, ionically, potentially ionically, nonionically hydrophilicizing compounds or a mixture thereof,
      A6) in methyl acetate,
   B) optionally the prepolymer obtained from step A is diluted by further addition of a solvent A6), and
   C) the remaining free NCO groups of the prepolymer are reacted with hydrazine or hydrazine hydrate as chain extenders so as to attain an arithmetic degree of chain extension of 40% to 100%, and
   wherein water is added by introducing the dissolved prepolymer or the chain extended polyurethane polymer into the dispersing water, or the dispersing water is added to the prepolymer or the polymer solutions.

4. A coating, adhesive bond, sealant or moulding produced from an aqueous polyurethane-polyurea dispersion of claim 3.

5. A substrate coated with a coating of claim 4.

6. A process according to claim 1, wherein the arithmetic degree of chain extension is of 60% to 100%.

7. A process according to claim 1, wherein the arithmetic degree of chain extension is of 85% to 100%.

8. A process according to claim 1, wherein plasticizers or solvents which boil above 100° C., which are non-ketonic and which are inert or only very slightly reactive towards isocyanate and hydrazine are added to the reactants in the preparation of the prepolymer, and wherein A2 comprises polymeric polyols selected from the group consisting of polycarbonate diols, polyester diols, including lactone-based polyester diols, and polyether diols.

9. An aqueous polyurethane-polyurea dispersion according to claim 3, wherein plasticizers or solvents which boil above 100° C., which are non-ketonic and which are inert or only very slightly reactive towards isocyanate and hydrazine are added to the reactants in the preparation of the prepolymer, and wherein the dispersion comprises no detectable amount of hydrazine when using colorimeter determination with 4-dimethylamino-benzaldehyde at 1000 times dilution of the dispersion.

* * * * *